(12) United States Patent
Annamalai et al.

(10) Patent No.: US 9,611,169 B2
(45) Date of Patent: Apr. 4, 2017

(54) DOPED ULTRA-LOW EXPANSION GLASS AND METHODS FOR MAKING THE SAME

(71) Applicant: Corning Incorporated, Corning, NY (US)

(72) Inventors: Sezhian Annamalai, Painted Post, NY (US); Carlos Alberto Duran, Ottawa (CA); Kenneth Edward Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/958,024

(22) Filed: Dec. 3, 2015

(65) Prior Publication Data

US 2016/0168010 A1 Jun. 16, 2016

Related U.S. Application Data

(60) Provisional application No. 62/091,152, filed on Dec. 12, 2014.

(51) Int. Cl.
*C03C 3/06* (2006.01)
*C03B 19/14* (2006.01)
(Continued)

(52) U.S. Cl.
CPC ............ *C03C 3/06* (2013.01); *C03B 19/1453* (2013.01); *C03B 19/1461* (2013.01);
(Continued)

(58) Field of Classification Search
CPC ............ C03C 2201/06; C03C 2201/11; C03C 2201/12; C03C 2201/40; C03C 2201/32; C03C 3/06
(Continued)

(56) References Cited

U.S. PATENT DOCUMENTS 7,294,595 B2 * 11/2007 Iwahashi ............. C03B 19/1415
219/553
7,935,648 B2 * 5/2011 Maida .................... B82Y 10/00
501/54
(Continued)

FOREIGN PATENT DOCUMENTS

DE 10349648 5/2005
DE 102004060600 7/2005
(Continued)

OTHER PUBLICATIONS

Invitation Pay additional fee—PCT/US2015/064662 of Apr. 1, 2016.
(Continued)

*Primary Examiner* — Noah Wiese
(74) *Attorney, Agent, or Firm* — Robert L. Carlson (57) ABSTRACT

A doped silica-titania glass article is provided that includes a glass article having a glass composition comprising (i) a silica-titania base glass, (ii) a fluorine dopant, and (iii) a second dopant. The fluorine dopant has a concentration of fluorine of up to 5 wt. % and the second dopant comprises one or more oxides selected from the group consisting of Al, Nb, Ta, B, Na, K, Mg, Ca and Li oxides at a total oxide concentration from 50 ppm to 6 wt. %. Further, the glass article has an expansivity slope of less than 0.5 ppb/$K^2$ at 20° C. The second dopant can be optional. The composition of the glass article may also contain an OH concentration of less than 100 ppm.

20 Claims, 3 Drawing Sheets (51) Int. Cl.
*C03B 25/02* (2006.01)
*C03C 3/112* (2006.01)
*C03C 4/00* (2006.01)

(52) U.S. Cl.
CPC .............. *C03B 25/02* (2013.01); *C03C 3/112* (2013.01); *C03C 4/00* (2013.01); *C03B 2201/07* (2013.01); *C03B 2201/075* (2013.01); *C03B 2201/12* (2013.01); *C03B 2201/14* (2013.01); *C03B 2201/23* (2013.01); *C03B 2201/32* (2013.01); *C03B 2201/40* (2013.01); *C03B 2201/42* (2013.01); *C03B 2201/50* (2013.01); *C03B 2201/54* (2013.01); *C03C 2201/12* (2013.01); *C03C 2201/14* (2013.01); *C03C 2201/32* (2013.01); *C03C 2201/40* (2013.01); *C03C 2201/42* (2013.01); *C03C 2201/50* (2013.01); *C03C 2201/54* (2013.01); *C03C 2203/52* (2013.01)

(58) Field of Classification Search
USPC .......................................................... 501/54
See application file for complete search history.

(56) References Cited

U.S. PATENT DOCUMENTS

| | | |
|---|---|---|
| 7,989,378 B2 | 8/2011 | Koike |
| 7,998,892 B2 | 8/2011 | Koike |
| 8,012,653 B2 | 9/2011 | Koike |
| 8,546,283 B2 | 10/2013 | Miyasaka et al. |
| 2006/0178879 A1 | 8/2006 | Murveit |
| 2006/0179879 A1* | 8/2006 | Ellison ................ C03B 19/1415 65/17.4 |
| 2008/0103037 A1 | 5/2008 | Iwahashi |
| 2008/0305941 A1* | 12/2008 | Maida .................... B82Y 10/00 501/54 |
| 2010/0179047 A1 | 7/2010 | Koike |
| 2010/0323873 A1 | 12/2010 | Koike |
| 2014/0155246 A1 | 6/2014 | Annamalai |

FOREIGN PATENT DOCUMENTS

| | | |
|---|---|---|
| DE | 102013002802 | 8/2013 |
| EP | 2463250 | 6/2012 |
| JP | 04792706 | 10/2011 |
| JP | 2010163347 | 10/2011 |
| WO | 2011068064 | 6/2011 |

OTHER PUBLICATIONS

Hagy, High Precision Photoelastic and Ultrasonic Techniques for Determining Absolute and Differential Thermal Expansion of Titania-Silica Glasses, Applied Optics, vol. 12, No. 7, Jul. 1973, pp. 1440-1446.

* cited by examiner

DOPED ULTRA-LOW EXPANSION GLASS AND METHODS FOR MAKING THE SAME

This application claims the benefit of priority under 35 U.S.C. §119 of U.S. Provisional Application Ser. No. 62/091,152 filed on Dec. 12, 2014 the content of which is relied upon and incorporated herein by reference in its entirety.

BACKGROUND

The disclosure is directed to doped, ultra-low expansion ("ULE") glass, glass articles and methods for making the same, including doped silica-titania ULE glass systems.

Extreme Ultra-Violet Lithography ("EUVL") is the emerging/leading lithography technology for the 13 nm node and beyond for manufacturing Micro Processing Units ("MPU") and Dynamic Random Access Memory ("DRAM") chips. The EUVL scanners which are used to produce MPU, DRAM and other integrated chips are presently being produced in small numbers to demonstrate this technology. Projection optics systems, particularly reflective optics systems, are an important part of these scanners. Low thermal expansion glass, for example Corning® Incorporated ULE® glass, is currently being used for making the projection optics systems used in EUVL scanners. Advantages of a low thermal expansion glass such as ULE® Glass include: polishability to the required finish, coefficient of thermal expansion ("CTE") and expansivity control, and dimensional stability.

As the development of EUVL systems proceeds, the specifications are becoming more stringent for newer optics systems, particularly those employed in high-volume integrated chip and semiconductor device manufacturing. As a result, the specifications for the materials employed in these optics systems, including CTE and expansivity criteria, are becoming increasingly more difficult to achieve. Accordingly, there is a need for ULE glass, and methods of making it, that can be employed in EUVL applications, for example.

SUMMARY

According to one aspect, a doped silica-titania glass article is provided that includes a glass article having a glass composition comprising (i) a silica-titania base glass, (ii) a fluorine dopant, and (iii) a second dopant. The fluorine dopant has a concentration of fluorine of up to 5 wt. % and the second dopant comprises one or more oxides selected from the group consisting of Al, Nb, Ta, B, Na, K, Mg, Ca and Li oxides at a total oxide concentration from 50 ppm to 6 wt. %. Further, the glass article has an expansivity slope of less than 0.5 ppb/$K^2$ at 20° C.

According to an additional aspect, a doped silica-titania glass article is provided that includes a glass article having a glass composition comprising (i) a silica-titania base glass, (ii) a fluorine dopant at a concentration of up to 5 wt. %, and (iii) an OH concentration of less than 100 ppm. The glass article has an expansivity slope of less than 0.5 ppb/$K^2$ at 20° C.

According to a further aspect, a method for making a silica-titania glass body is provided that includes the steps: preparing doped silica-titania soot particles using a silica precursor and a titania precursor (and any non-alkali dopant precursors, if present); forming a soot blank from the soot particles; and consolidating the soot blank in a furnace, wherein the consolidation step includes: (a) heating the soot blank to more than 1200° C. in a flowing inert atmosphere, and (b) consolidating the blank at a peak temperature of more than 1250° C. under a flowing consolidation gas comprising helium- and oxygen-containing gases, and a doping gas comprising a fluorine-containing gas. The method further includes the steps: sectioning the blank into at least one glass body; heating the at least one glass body to a crystal melting temperature of at least 1500° C.; and cooling the at least one glass body from the crystal melting temperature to room temperature. The step for cooling includes a first annealing of the at least one glass body for about 2 hours to 2000 hours between 1050° C. and 700° C. at a first cooling rate between about 50° C./hour and 0° C./hour.

According to another aspect, a method for making a doped silica-titania glass body is provided that includes the steps: preparing silica-titania soot particles using a silica precursor and a titania precursor (and any non-alkali dopant precursors, if present); forming a soot blank from the soot particles; and consolidating the soot blank in a furnace, wherein the consolidation step includes: (a) heating the soot blank to more than 1200° C. in a flowing inert atmosphere, and (b) consolidating the blank at a peak temperature of more than 1250° C. under a flowing consolidation gas comprising helium- and oxygen-containing gases. The method further includes the steps: sectioning the blank into at least one glass body; heating the at least one glass body to a crystal melting temperature of at least 1500° C.; and diffusing an alkali dopant at a concentration of 0.04 wt. % to 1.4 wt. % by alkali oxide into the blank at or above 500° C. after the step of heating the at least one glass body to a crystal melting temperature. The method also includes the step: cooling the at least one glass body from the crystal melting temperature to room temperature. The step for cooling includes a first annealing of the at least one glass body for about 2 hours to 2000 hours between 1050° C. and 700° C. at a first cooling rate between about 50° C./hour and 0° C./hour. According to one aspect, the step for preparing silica-titania soot particles further comprises using at least one dopant precursor selected from the group consisting of B-, halogen-, OH-, Mn-, and alkaline earth-containing precursors.

In some aspects, the foregoing methods can further include a second annealing of the at least one glass body after the first annealing that comprises (i) heating the at least one glass body to an upper annealing temperature in the range of 800° C. to 1000° C. for about 0.5 to 2 hours, and (ii) cooling the at least one glass body from the upper annealing temperature to a lower annealing temperature in the range of 600° C. to 700° C. at a second cooling rate between about 50° C./hour and 0° C./hour. The second annealing step is conducted during or after the step of cooling the at least one glass body from the crystal melting temperature to room temperature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts. It should be understood that the embodiments disclosed herein are merely examples, each incorporating certain benefits of the present disclosure.

Various modifications and alterations may be made to the following examples within the scope of the present disclosure, and aspects of different examples may be mixed in different ways to achieve yet further examples. Accordingly, the true scope of the disclosure is to be understood from the entirety of the present disclosure, in view of but not limited to the embodiments described herein.

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

The present disclosure is directed to a doped silica-titania glass $SiO_2$—$TiO_2$ glass articles ("DST glass"), having an expansivity (or CTE) slope that is significantly improved over conventional silica-titania systems. In some aspects, the dopants are halogens, preferably fluorine. In some aspects, additional dopants include one or more oxides of Al, Nb, Ta, B, Na, K, Mg, Ca and Li. In another aspect, the DST glass can be doped with an alkali dopant, e.g., as derived from one or more of Li-, Na-, K- and Rb-containing precursors, and, optionally, an additional dopant derived from B-, halogen-, OH-, Mn- and alkaline earth-containing precursors. When using the DST glass disclosed herein the improvement in the expansivity slope of the glass exceeds the improvements that are possible by adjustment of the annealing cycle alone. Accordingly, faster annealing cycles for the glasses herein can be used in some aspects of this disclosure which greatly reduces the manufacturing costs associated with the products employing the glasses. This is accomplished via a combination of both structural and compositional changes to the glasses.

According to this disclosure, the base glass constituent of the DST glass is a silica-titania glass. When a dopant is added to the base glass to make a low expansivity slope glass according to this disclosure, the composition of the resulting glass is given as wt. % or ppm (by weight) of the added dopant.

Compositionally, the DST glass is preferably a silica-titania system that includes a halogen dopant, for example, fluorine, F, or an alkali dopant, for example, Li, Na or K. In some aspects, the DST glass also includes one or more of the oxides of (or hydroxides of) Al, Nb, Ta, B, Na, K, Mn, Mg, Ca and Li, added to the halogen- or alkali-doped, titania-silica glass system In one embodiment, the DST glass contains up to about 5 wt. % F, preferably between about 0.1 to 5 wt. % F, and most preferably between about 0.2 to 3 wt. % F. In some aspects, the DST glass also includes from 50 ppm to 6 wt. % of oxides of one or more of Al, Nb, Ta, B, Na, K, Mg, Ca and Li. According to some embodiments, the DST glass includes about 3 wt. % to 10 wt. % $TiO_2$ and the remainder $SiO_2$. In another embodiment, the DST glass contains about 0.2 wt. % to 3 wt. % F, 50 ppm to 6 wt. % of oxides of one or more of Al, Nb, Ta, B, Na, K, Mg, Ca and Li, about 3 wt. % to 10 wt. % $TiO_2$ and the remainder $SiO_2$. In an additional embodiment, the DST glass contains about 1 wt. % to 2 wt. % F, 50 ppm to 6 wt. % of oxides of one or more of Al, Nb, Ta, B, Na, K, Mg, Ca and Li, about 5 wt. % to 8 wt. % $TiO_2$ and the remainder $SiO_2$. In other embodiments, the DST glass (e.g., (e.g., a DST glass with a halogen dopant such as fluorine, or a DST glass with a halogen dopant and one or more oxide dopants) can contain about 8 wt. % to 16 wt. % $TiO_2$, or 8 wt. % to 10 wt. % $TiO_2$, and the remainder $SiO_2$.

According to an embodiment, the DST glass contains an alkali dopant at 0.04 wt. % to 1.4 wt. % (by alkali oxide). Preferably, the alkali-doped DST glass contains an alkali dopant at 0.1 wt. % to 1.4 wt. % (by alkali oxide). $Li_2O$, $Na_2O$ or $K_2O$ employed as alkali-dopant precursors should be controlled to no more than 0.8, 1.2 and 1.4 wt. %, respectively. Further, boron levels (when added as a dopant) in alkali-doped DST glass can be between about 0 to 5 wt. %, with levels between 0 and 3 wt. %, or as low as between 0 to 2 wt. %, preferable. Furthermore, an alkali-doped DST glass can include about 8.5 wt. % to about 16 wt. % $TiO_2$ and the remainder $SiO_2$. In some embodiments, the alkali-doped DST glass can include about 11 wt. % to about 16 wt. % $TiO_2$ and the remainder $SiO_2$.

According to some embodiments, the DST glass has an OH concentration of less than 100 ppm. In another embodiment, the OH concentration is less than 50 ppm. In a further embodiment, the OH concentration is less than 30 ppm. In an additional embodiment, the OH concentration is less than 20 ppm. Further, the OH concentration in alkali-doped DST glass can be between about 0 and 3000 ppm, with levels at 0 to 1600 ppm preferred.

Structurally, the annealing cycle of the DST glass is controlled to yield the desired glass structure(s). It has been found that while annealing alone can provide a structural improvement leading to an expansivity slope reduction of up to 40% for a silica-titania glass that does not contain a halogen dopant, such as fluorine, the additional dopants, in an amount in the ranges disclosed herein, provides for structural improvements that can lead to a CTE slope reduction in excess of 70%. In one aspect, the DST glass has an expansivity slope of less than 1.3 ppb/K². In another aspect, the DST glass has an expansivity slope at 20° C. of less than 1 ppb/K². In an embodiment, the expansivity slope of the DST glass at 20° C. is less than 0.8 ppb/K². In another embodiment, the expansivity slope of the DST glass at 20° C. is less than 0.6 ppb/K². Even further reductions in the expansivity slope of the DST glass are feasible according to aspects of this disclosure including expansivity slope values at 20° C. of less than 0.5 ppb/K$^2$, less than 0.4 ppb/K$^2$, or less than 0.25 ppb/K$^2$. It is also believed that the non-fluorine doped DST glass aspects of this disclosure will also demonstrate some or all of the foregoing expansivity slope levels.

Additionally, the annealing cycle of the DST glass can be controlled in such a manner to yield high degrees of homogeneity in the fictive temperature, $T_f$, of the DST glass. This aspect can be particularly important due to the presence of the dopants in the DST glass with non-uniform concentrations. Further, the fictive temperature homogeneity of alkali-doped DST glass can benefit from annealing given the high diffusivity of alkali-dopants in the glass. Halogen dopants can especially affect the fictive temperature and any non-uniformity in their distribution could cause large variations in properties, rendering the DST glass non-usable for certain applications. In one aspect, the DST glass has a fictive temperature, $T_f$, of less than 875° C. In another embodiment, the DST glass has a fictive temperature of less than 825° C. In another embodiment, the DST glass has a fictive temperature of less than 775° C. Still further, aspects of this disclosure include DST glass with a fictive temperature of less than 750° C. or, in some cases, less than 725° C. It is further believed that the non-fluorine doped DST glass aspects of this disclosure will also demonstrate some or all of the foregoing fictive temperature levels.

This DST glass disclosed herein is not process limited. That is, the DST glass, and glass articles employing the DST glass, can be made by different manufacturing processes, for example, sol-gel, soot blank, soot pressing, overhead vapor deposition, the direct process, the indirect process, plasma process and other processes known in the art.

The DST glass has two crossover temperatures, $T_{ZC}$, (i.e., the $_{temperatures}$ at which the CTE of the glass is zero) within the normal operational range for the glass when used in lithographic processes (including processes using 13 nm wavelength radiation) and other applications associated with ULE glass and Corning® ULE® glass. In one embodiment, the two $T_{ZC}$ values are in the range of 0° C. to 150° C. In one aspect, the two $T_{ZC}$ values are in the range of 0° C. to 100° C. In another embodiment, the two $T_{ZC}$ values are in the range of 20° C. to 100° C. In a further embodiment, the two $T_{ZC}$ values are in the range of 20° C. to 80° C. In an embodiment, the two $T_{ZC}$ values are in the range of 10° C. to 60° C., 20° C. to 60° C., or even 10 to 40° C. In an additional embodiment, the DST glass has a Tzc in the range of 0° C. to 100° C. in combination with an expansivity slope which substantially equals zero within this temperature range.

In an embodiment, the DST glass (e.g., a DST glass with a halogen dopant such as fluorine, or a DST glass with a halogen dopant and one or more oxide dopants) has a strain point of less than 900° C. In another embodiment, the strain point of the DST glass is less than 850° C. In a further embodiment, the strain point of the DST glass is less than 810° C. The DST glass of this disclosure has a viscosity that is significantly reduced over that of the conventional binary silica-titania glass $SiO_2$—$TiO_2$. For example, a conventional binary silica-titania glass can exhibit an anneal point of 1001° C. and a strain point of 892° C., whereas the DST glass of one embodiment has anneal and strain points of 885° C. and 770° C., respectively.

The DST glass according to this disclosure can exhibit a high degree of fictive temperature, Tzc and CTE homogeneity. In one embodiment, the $T_f$ of the DST glass varies less than ±10° C. within an entire article. In another embodiment, the $T_f$ variation of the DST glass is less than ±5° C. within an entire article. In a further embodiment, the $T_f$ variation of the DST glass is less than ±2° C. within an entire article. In one embodiment, the Tzc variation of the DST glass is less than ±5° C. within an entire article. In another embodiment, the Tzc variation of the DST glass is less than ±3° C. within an entire article. In an additional embodiment, the Tzc variation of the DST glass is less than ±2° C. within an entire article. These Tzc and $T_f$ variation levels are calculated based on measurements made in a volume of DST glass material measuring 2 mm×2 mm×2 mm and averaged over that volume. In these embodiments, the variation in these average $T_f$ and Tzc values within the entire article satisfy the foregoing limits. It should also be noted that these homogeneity levels require both good control of composition as well as tight control of the annealing process.

In one aspect of this disclosure, an article made from the DST glass has a Mid-Spatial Frequency Roughness ("MSFR") of less than 0.2 nm rms. In another embodiment, the MSFR of the article employing the DST glass is less than 0.15 nm rms. In a further embodiment, the MSFR of the article employing the DST glass is less than 0.12 nm rms or, in some cases, less than 0.10 nm rms.

In an embodiment of the DST glass in this disclosure, the peak CTE ("$CTE_{max}$") within the two crossover temperatures does not exceed 30 ppb/K and has a slope of about 0 ppb/K$^2$ within the two crossover temperatures. In another embodiment, peak CTE of the DST glass within the two crossover temperatures do not exceed 20 ppb/K. In a further embodiment, the peak CTE of the DST glass within the two crossover temperatures is less than 15 ppb/K. In an additional embodiment, the peak CTE of the DST glass within the two crossover temperatures is less than 10 ppb/K. In a further embodiment, the peak CTE of the DST glass within the two crossover temperatures is less than 8 ppb/K.

According to some aspects of the disclosure, the DST glass can be fabricated with a process that involves a step of heating the material above 1500° C. for at least 1 minute, and as long as 1 hour in some cases. Preferably, the material is heated for these durations to temperatures above 1600° C. These high-temperature heating steps can be a necessary step in the process of making the DST glass when any crystals, such as $TiO_2$ crystals, are present within the glass at measurable concentrations. Temperatures at or above 1500° C. can melt these crystals within the DST glass. The presence of crystals can usually be detected with the eye if opacity is present or by powder x-ray diffraction ("XRD"), scanning electron microscopy ("SEM") and/or optical microscopy. These analytical techniques are expected to allow measurements of the presence of crystals at levels of less than approximately 0.1 vol. %.

Once the crystals are melted via the foregoing high-temperature process step, the DST glass should be subjected to at least one annealing step. This annealing step (or steps) can be conducted during and/or after the cooling of the DST glass from the high-temperature crystal melting temperature to room temperature. The annealing has at least two purposes. One, annealing is performed on the DST glass to obtain a lower $T_f$ in the glass. Second, annealing is performed to minimize birefringence in the glass caused by non-uniform cooling. Annealing of the DST glass can be effective in the range of approximately 1050° C. to 700° C., approximately 900° C. to 600° C., and approximately 1000° C. to 800° C., depending on, for example, the prior processing history and composition of the DST glass. The duration of the annealing of the DST glass can range from about 2 to 2000 hours. Preferably, annealing of the DST glass is conducted between 30 and 1500 hours, and most preferably between 50 and 800 hours. The DST glass can be subjected to cooling rates of between about 100° C./hr to 0° C./hr during the annealing and, optionally, pre- and/or post-annealing. Preferably, the DST glass is subjected to cooling rates of between 50° C./hr to 0° C./hr during the annealing. It also preferable to subject the DST glass to cooling rates of between 30° C./hr to 0.1° C./hr, 5° C./hr to 0.1° C./hr, or even slower cooling levels of 2° C./hr to 0.1° C./hr, during the annealing.

In some aspects of the methods of making the DST glass according to the disclosure, a secondary annealing step (e.g., after the first annealing according to the foregoing) in the range of approximately 1050° C. to 600° C. can be conducted to further refine and homogenize the $T_{ZC}$. Preferably, the DST glass is subjected to cooling rates of between 50° C./hour and 0° C./hour during the secondary annealing. According to one aspect, a secondary annealing step can be employed to tune a desired $T_{ZC}$ for the glass after a desired expansivity slope and fictive temperature is obtained through doping and/or control of the post-annealing cooling rate. For example, a secondary annealing step can be conducted in the process used to make the DST glass such that $T_{ZC}$ is less than ±2° C., less than ±1° C., less than ±0.5° C., or even less than ±0.3° C., within an article employing the DST glass.

The DST glass of this disclosure can be used to make photo mask blanks or projection optics mirror substrates, for example. The DST glass can also be used to make smaller blanks which can then be used to form the critical zone of a mirror blank of a projection optics system in a EUVL stepper. Halogen, alkali and other oxide (as applicable) doping can be achieved during consolidation of a regular titania-silica OVD blank. Alternatively, shapes and articles made by either soot-pressing or sol-gel method can be doped with the halogen and oxide(s) (as applicable) during consolidation.

In this disclosure, the expansivity of the DST glass over a given temperature range, ΔCTE, is the difference between the peak CTE, $CTE_{max}$, and the minimum CTE ("$CTE_{min}$") over the temperature range and can be determined by the equation:

$$\Delta CTE = CTE_{max} - CTE_{min} \quad (1)$$

Figure 3:
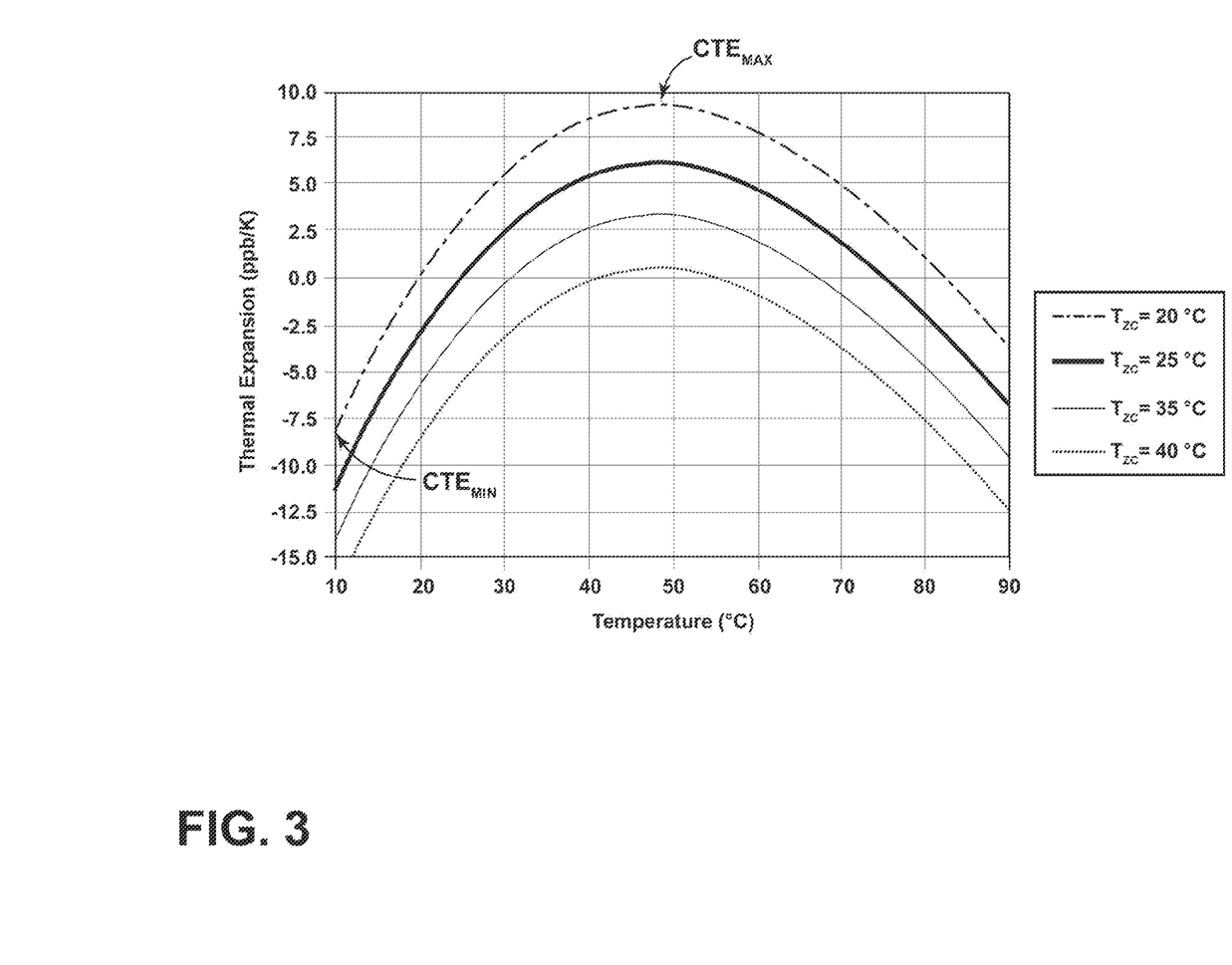
FIG. 3 is a graph of expansivity (ppb/K) vs. temperature (° C.) behavior between 10° C. and 90° C. for doped silica-titania ULE glass with varying titania concentration levels to yield varying zero crossover temperatures, $T_{zc}$, according to an additional aspect of the disclosure.

As shown in FIG. 3, the locations of $CTE_{max}$ and $CTE_{min}$ are depicted in connection with the CTE vs. temperature curve for the DST glass labeled "$T_{ZC}$=20° C."

For EUV lithography employing DST glass articles according to this disclosure, it is important that the expansivity of lithographic elements be maintained as close to zero as possible over the widest possible operational temperature range. A zero expansivity means that the material neither expands not contracts.

Employing DST glass with reduced expansivity provides an important benefit for projection optics mirror blanks as well as photomask blanks for EUVL steppers. The DST glass described herein has a reduced CTE slope (the slope is a measurement of the instantaneous change in CTE (ppb/K) versus temperature (in K)) which will allow EUVL stepper makers to use higher source power because of the improved thermal and/or dimensional stability of the DST glass detailed in this disclosure. The DST glass described herein will also enable EUVL users to achieve much higher resolution. Further, the DST glass described herein can be used in small quantities for the critical zone in a projection optics mirror which will help lower the cost of large projection optics mirrors that possess a diameter in the range of 10 cm to 60 cm.

The tuning of the DST glass according to this disclosure (e.g., a DST glass with a halogen dopant such as fluorine, or a DST glass with a halogen dopant and one or more oxide dopants) for optimal performance in a specified application depends on the details of the operating conditions in which the glass will be used. The combination of adjustments in $TiO_2$ concentration and the fictive temperature, $T_f$, enables the adjustment of the two crossover temperatures, $T_{ZC1}$ and $T_{ZC2}$, and also the expansivity maximum to optimize performance in each application. Without doping, $T_{ZC1}$ of silica-titania glass can be adjusted by manipulation of $TiO_2$ concentration alone. Slow annealing can also be used to lower the expansivity slope and bring $T_{ZC2}$ to lower levels. However, an extremely low expansivity of +/−3 ppb/K over a range of tens of degrees Celsius (° C.) can only be obtained at temperatures in the neighborhood of the expansivity maximum. Thus, such a desirable regime can only be obtained in the undoped-conventional annealed glass at temperatures starting at ~150° C. In contrast, the use of doping in the silica-titania glass, e.g., as DST glass described herein, significantly enlarges the adjustment range of $T_{ZC}$, thus enabling an extremely low expansivity range to exist at temperatures starting at around room temperature. This situation is particularly beneficial for the application of the DST glass as a substrate for EUV masks and optics, whose temperature range of operation starts at room temperature. Since different components in an EUV system are exposed to different temperature variations, and as EUV system design and operation regimes depend on the evolution of developments in other areas such as system numerical aperture ("NA"), resist speed and source light intensity, no single combination of glass composition and $T_f$ is ideal for all situations. Manipulation of $T_{ZC}$ over a wide temperature range thus enables tuning of the material to the specific requirements in each particular application.

According to some aspects, a DST glass is provided that contains up to 5 wt. % halogens, preferably fluorine. In some aspects, the DST glass also includes 50 ppm to 6 wt. % of one or more oxides of Al, Nb, Ta, B, Na, K, Mg, Ca and Li. The halogen doping and doping of one more oxides (if applicable) is typically completed during and/or before the consolidation step of the glass process. Doping of halogens and oxides during the consolidation step enables the making of an initial oxide doped soot blank by different methods including but not limited to overhead vapor deposition ("OVD"), soot pressing of premade silica-titania soot, and sol-gel of premade silica-titania soot.

In the OVD process, a soot blank is made in a burner by the combustion of a silica precursor, a titania precursor and the oxide dopant precursor(s). The soot is then collected on a mandrel and treated with a halogen-containing gas, such as fluorine derived from $SiF_4$. The soot is then consolidated, and then collected to form a DST glass.

In a soot pressing process for preparing the DST glass, premade titania-silica soot is developed by the combustion of a silica precursor and a titania precursor in a burner. The soot, which is essentially in a particulate form, is collected in a vessel; and during and/or after the collection of the soot, the soot is treated with a halogen while pressing the soot at consolidation temperatures to form the DST glass. The silica-titania glass can also be further doped during preparation of the soot by the addition of one or more oxide dopant precursor(s), for example an Al, Nb, Ta, B, Na, K, Mg, Ca and/or Li precursor.

In a sol-gel process employed to prepare a DST glass, silica-titania soot is made and then formed into an interim shape using a sol-gel process. The shape is then dried to form porous silica-titania articles that are then treated with a halogen-containing gas during consolidation (i.e., to introduce the halogen dopant into the glass). In an embodiment, one or more oxide dopant precursors are added to the sol-gel interim shape before it is formed into a final shape, dried and treated with the halogen-containing gas during consolidation. Consolidation may be carried out in air or in an air-inert gas mixture. In another embodiment, the soot used in the sol-gel process is one in which the additional oxide precursors were added during the formation of the silica-titania soot via a soot pressing process as described earlier in the foregoing.

There are other methods known in the art that can be used to make the silica-titania soot which can then be treated with a halogen-containing gas during consolidation. While it is possible to make silica-titania soot and immediately consolidate it in a halogen-containing atmosphere to form a DST glass (i.e., without any intermediate step such as forming a soot blank and consolidating the blank), this method is not favored because of environmental and possible health hazards. For example, an expensive scrubber system would be required to prevent halogens such as chlorine and fluorine from escaping into the atmosphere and harming persons working nearby.

When the halogen dopant employed in the DST glass is fluorine, the fluorine-containing gas employed during processing can be $F_2$, $CF_4$, $SF_4$, $SiF_4$ or other volatile fluorine-containing compounds mixed with a carrier gas, for example air. These fluorine-containing gases are selected to produce a target F concentration in the DST glass. When compounds such as $CF_4$ and $SF_4$ are used as the fluorinating agent, oxygen is present in the carrier gas in order to convert the non-fluorine portion of the fluorinating agent (C, Si or S) to a volatile species, for example $CO_2$, SiO or $SO_2$, which is swept out of the system by the carrier gas. The carrier gas can also be an inert gas, for example nitrogen, helium or argon, However, when inert gases are used as the carrier gas for $CF_4$, $SiF_4$ and $SF_4$, oxygen should be present as indicated above. Halogens, in addition to doping the glass, can dehydrate the glass. In particular, the halogen will reduce the number of hydroxyl groups (e.g., $OH^-$ groups) that may be present in the glass. Dehydration can also be effected using a mixture of chlorine and fluorine, or sequentially by first dehydrating using chlorine and then using a fluorine-containing species such as those described above to dope the glass with fluorine.

According to some aspects of the disclosure, the consolidation temperature will depend on the method of soot blank preparation and can vary from 1250° C. to 1670° C., e.g., 1300° C. for an OVD process to 1670° C. for other processes such as soot pressing and sol-gel. If $TiO_2$ crystallites are present after consolidation, the DST glass can be heated to about 1500° C., or even as high as 1650° C., to remove them.

In some aspects, the DST glass can include an alkali dopant at a concentration between about 0.04 wt. % to about 1.4 wt. % (by weight of alkali oxide). Given the high diffusivity of alkali dopants in DST glass, alkali doping is preferably completed after consolidation and, if applicable, any additional step conducted to melt crystals developed in the glass during forming processes (e.g., titania crystals). In one aspect, alkali doping can be conducted during or before annealing of the DST glass at temperatures exceeding 500° C. Alkali doping can be conducted in the temperature range of about 1500° C. to about 800° C. and, in some aspects, between about 1100° C. and 800° C.

Following consolidation (and crystallite removal at temperatures at or above 1500° C., if applicable), the DST glass can be cooled at a controlled rate of about 100° C./hr to 0° C./hr within the annealing range of about 1050° C. to about 700° C. These cooling rates can also be employed pre- and post-annealing. Other annealing ranges with these cooling rates can be employed including a range of about 900° C. to 600° C., and approximately 1000° C. to 800° C., depending on the prior processing history and composition of the DST glass, for example.

Next, the DST glass can be reheated (i.e., annealed again) to an upper annealing temperature, preferably between 1100° C. and 800° C., more preferably between 1000° C. and 800° C., or also preferably between 970° C. and 870° C., for a duration of about 0.5 to 2 hours. The reheating step can be conducted after the DST glass has reached room temperature after a first annealing, or during the step of cooling the DST glass from the consolidation temperature and crystal melting temperature, as applicable, down to room temperature. At the end of the annealing duration, the DST glass can then be cooled at a controlled cooling rate from the upper annealing temperature down to a lower annealing temperature in the range of about 700° C. to 600° C. In one embodiment, the upper annealing temperature was set at 1050° C. and the holding time at the upper annealing temperature was 1 hour. In another aspect, the DST glass was annealed at 870° C. for 1 hour. One or more annealing steps can help homogenize the fictive temperature distribution within the DST glass, particularly when alkali dopants are employed.

According to some aspects, the controlled cooling rates employed during annealing can be selected at least in part to develop a desired zero crossover temperature for the article containing the DST glass. In an additional aspect, the concentration of titania in the DST glass can be adjusted to develop a desired zero crossover temperature for the article containing the DST glass. It also possible to adjust the controlled cooling rate during annealing and the upper annealing temperature to tune or otherwise develop a selected zero crossover temperature for the DST glass.

In some aspects, the controlled cooling rate between the upper and lower annealing temperatures can be set at a rate from about 100° C. per hour to 0° C. per hour. The controlled cooling rate can also be set between about 60° C. per hour to slower cooling rates approaching 0.1° C. per hour. In some aspects, the controlled cooling rate is set between 30° C. per hour and 0.1° C. per hour. In certain aspects, the controlled cooling rate is set between 5° C. per hour and 0.1° C. per hour. Preferably, the controlled cooling rate is set at, e.g., 3° C. per hour, 1° C. per hour or 0.3° C. per hour. After controlled cooling from the upper annealing temperature to the lower annealing temperature, the DST glass can then be cooled to room temperature via natural cooling. As defined herein, "natural cooling" relates to the cooling rate of the system associated with turning off the heat source and allowing the glass to cool to room temperature at the cooling rate of the furnace.

After fabrication, the expansivity of the DST glass can be measured by a sandwich seal method in a temperature range of −50° C. to 150° C. with a precision of ±0.05 ppb/$K^2$. The sandwich seal method is outlined in H. Hagy, "High Precision Photoelastic and Ultrasonic Techniques for Determining Absolute and Differential Thermal Expansion of Titania-Silica Glasses, *Applied Optics*, vol. 12, No. 7, July 1973, pp. 1440-46, incorporated by reference herein. The fictive temperature $T_f$ of the annealed glass can be measured using a Fourier transform infrared spectroscopy ("FTIR") technique with a precision of ±10° C. per hour.

A reduction in expansivity of about 80% over conventional glass has been observed for DST glass prepared in accordance with aspects of this disclosure. In general, the data suggests that the improved expansivity slope obtained for the DST glass according to this disclosure is largely dictated by reduced fictive temperatures, $T_f$, for this ternary system (e.g., halogen-doped silica-titania glass). Continued improvements in expansivity slope are expected based on further reductions to $T_f$ via halogen dopant levels, halogen and oxide dopant levels and/or controlled annealing cycles. It is believed, for example, that the addition of fluorine as a dopant to the silica-titania system reduces the viscosity of the glass, affording a concomitant reduction in $T_f$ without a large change in the absolute CTE.

EXAMPLE ONE

Titania and silica soot particles were made by flame hydrolysis of $TiCl_4$ and $SiCl_4$, respectively, and the soot was deposited on a bait rod in a lathe using the OVD process for about 16.5 hours. The soot blank thus made was 6010 g in mass with a density of 0.43 g/cc and a diameter of 135.2 mm. The soot blank was then consolidated in a muffle furnace as follows: heating to 1125° C. for 60 minutes in flowing (5 slpm—standard liters per minute) He. Then, the soot blank was dried by passing 0.15 slpm $Cl_2$ gas along with 5 slpm He for a further 120 minutes at 1125° C. in the furnace. Next, Cl was purged by flowing 4.96 slpm He, 0.04 slpm $O_2$ and 0.75 slpm $SiF_4$ for 40 minutes at 1125° C. Finally, the blank was sintered at a peak temperature of 1385° C. with a down drive speed of 6 mm/min in the muffle furnace with 4.96 slpm He, 0.04 slpm $O_2$ and 0.75 slpm $SiF_4$ for a target F concentration of 1.5 wt % in the glass. The resulting blank was bluish gray in color due to the presence of $TiO_2$ crystallites. 60 mm long (in the axial direction) by 40 mm wide (in the tangential direction) and 15 mm thick pieces were cut from the consolidated blank and were heated to 1670° C. for 1 hours to dissolve the crystallites and to get a clear glass. The pieces were cooled at 30° C./h between 1050° C. and 700° C. These pieces were then annealed by heating them to 870° C. for 1 hour and then cooling at a controlled cooling rate from 620° C. at 1° C./h or 0.3° C./h to achieve two different fictive temperatures, $T_f$, of 713° C. and 698° C., respectively.

These samples were then polished and assembled into sandwich seals with a regular Corning® ULE® glass (i.e., Corning Code 7973 glass) as the central piece between two experimental samples of the same composition and $T_f$. The sandwich seal samples are approximately of the size 1.5"×1"×⅛". Stress on the center piece (meat of the sandwich) exerted by the two experimental pieces (breads of the sandwich) was measured as the sandwich was heated from −50° C. to +150° C. from which the difference in the CTE slope between the experimental material and the regular ULE® glass, whose CTE slope is known, is extracted. The samples with a $T_f$ of 713° C. exhibited a CTE slope of less than 0.3 ppb/$K^2$ and the samples with a $T_f$ of 698° C. had an average CTE slope of less than 0.2 ppb/$K^2$ at 20° C.

EXAMPLE TWO

Titania and silica soot particles were made by flame hydrolysis of $TiCl_4$ and $SiCl_4$, respectively, and the soot was deposited on a bait rod in a lathe using the OVD process for about 16.5 hours. The soot blank thus made was 5992 g in mass with a density of 0.42 g/cc and a diameter of 135.7 mm. The soot blank was then consolidated in a muffle furnace as follows: heating it to 1125° C. for 60 minutes in flowing (5 slpm—standard liters per minute) He. Then, the soot blank was dried by passing 0.15 slpm $Cl_2$ gas along with 5 slpm He for a further 120 minutes at 1125° C. in the furnace. Next, purging of Cl was effected by flowing 5 slpm He for 30 minutes at 1125° C. Finally, the blank was sintered at a peak temperature of 1440° C. with a down drive speed of 6 mm/min in the muffle furnace with 4.92 slpm He, 0.08 slpm $O_2$ and 0.2 slpm $SiF_4$ for a target F concentration of 0.8 wt % in the glass. The resulting blank was bluish gray in color due to the presence of $TiO_2$ crystallites. 60 mm long (in the axial direction) by 40 mm wide (in the tangential direction) and 15 mm thick pieces were cut from the consolidated blank and were heated to 1670° C. for 1 hour to dissolve the crystallites and to get a clear glass. The pieces were cooled at 30° C./h between 1050° C. and 700° C. These pieces were then annealed by heating them to 970° C. for 1 hour and then cooling at a controlled cooling rate to 700° C. at either 1° C./h or 0.3° C./h to achieve two different fictive temperatures, $T_f$, of 760° C. and 752° C., respectively.

These samples were then polished and assembled into sandwich seals with a regular Corning® ULE® glass (i.e., Corning Code 7973 glass) as the central piece between two experimental samples of the same composition and $T_f$. The sandwich seal samples are approximately of the size 1.5"×1"×⅛". Stress on the center piece (meat of the sandwich) exerted by the two experimental pieces (breads of the sandwich) was measured as the sandwich was heated from −50° C. to +150° C. from which the difference in the CTE slope between the experimental material and the regular ULE® glass, whose CTE slope is known, is extracted. The samples with a $T_f$ of 760° C. exhibited a CTE slope of less than 0.9 ppb/$K^2$ at 20° C. and the samples with a $T_f$ of 752° C. had an average CTE slope of less than 0.8 ppb/$K^2$ at 20° C.

Figure 1:
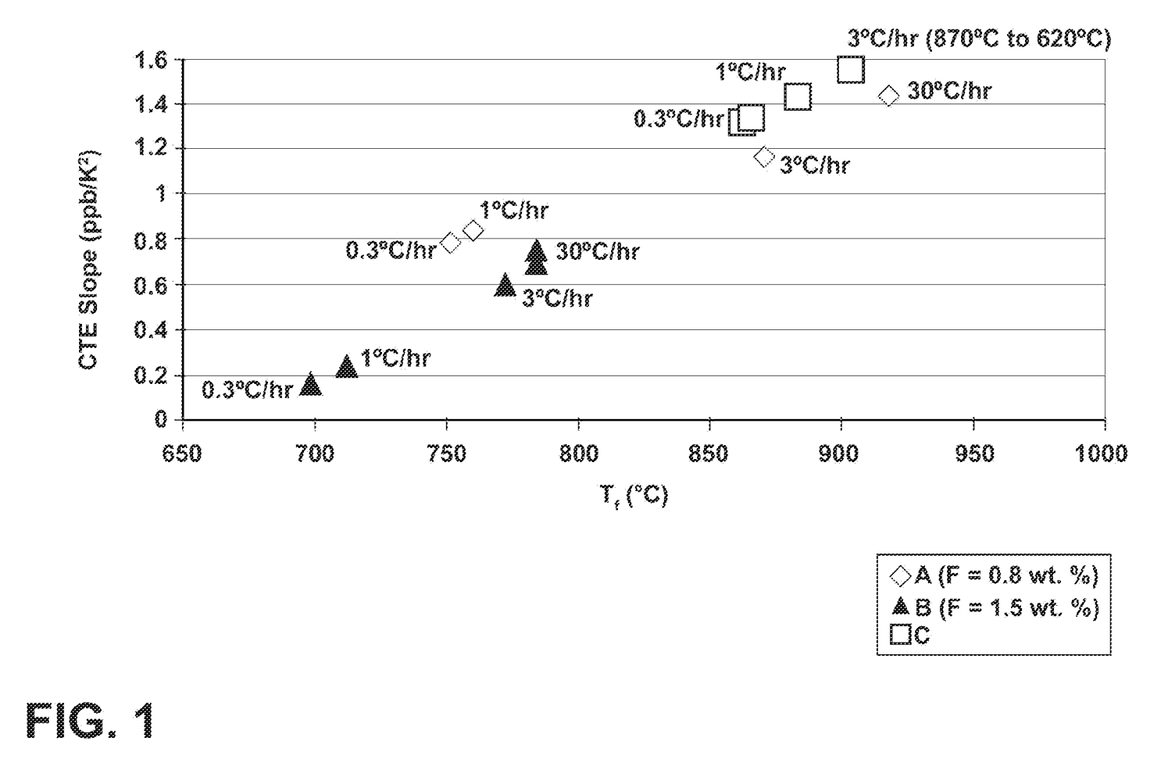
FIG. 1 is a graph of CTE slope (ppb/K²) vs. fictive temperature, $T_f$(° C.), illustrating the effect of fluorine dopant level and post-annealing cooling rate from about 870° C. to 620° C. according to one aspect of the disclosure.

In FIG. 1, the CTE slope (ppb/$K^2$) vs. fictive temperature, $T_f$(° C.), is illustrated for DST glasses prepared according to this disclosure. In particular, FIG. 1 demonstrates the effect of both fluorine dopant levels and post-annealing cooling rate (between 870° C. and 620° C.) on the fictive temperature and CTE slope of the DST glass. The "C" data series (exemplified by box symbols) reflect fictive temperature and CTE slope measurements for Corning® ULE® glass (no halogen dopant), serving as a control in FIG. 1. As the "C" group of data in FIG. 1 demonstrates, reductions in the controlled cooling rate post-annealing can reduce CTE slope and $T_f$, at least to about 1.3 ppb/$K^2$ and 860° C., respectively, for a controlled cooling rate of 0.3° C./hour.

Also shown in FIG. 1, DST glass prepared according to this disclosure is exemplified by the "A" and "B" data series, diamond and triangle symbols, respectively. The "A" group corresponds to DST glass with a halogen dopant of about 0.8 wt. % F. The "B" group corresponds to DST glass with a halogen dopant of about 1.5 wt. % F. Very significant reductions in CTE slope and $T_f$ are observed in both the "A" and "B" groups. The combination of controlled cooling post-annealing and the addition of halogen dopants (e.g., F) according to aspects of this disclosure, makes it feasible to produce DST glass and articles having expansivity slope levels of about 0.8 ppb/$K^2$ (F=about 0.8 wt. %; 0.3° C./hr cooling rate) and less than 0.2 ppb/$K^2$ (F=1.5 wt. %; 0.3° C./hr cooling rate) for the "A" and "B" groups, respectively. Likewise, the combination of controlled cooling post-annealing and the addition of a halogen dopants allows for the production of DST glass with lower fictive temperatures, $T_f$, e.g., 750° C. and 700° C. for the "A" and "B" groups, respectively.

More generally, the results in FIG. 1 suggest that additions of fluorine to the DST glass and the post-annealing cooling rate both can decrease the viscosity of the glass, thereby decreasing its fictive temperature. Fictive temperature reductions usually correlate to reductions in CTE expansivity, as is also evident from the data in FIG. 1. Notably, the reductions in expansivity and $T_f$ observed as a function of reductions to the post-annealing cooling rate are more pronounced for the DST glasses containing fluorine dopants, i.e., the "A" and "B" groups, compared to the control, "C" group that lacks a dopant. It is also believed that the further addition of one or more oxide dopants to the DST glass, according to some aspects of the disclosure, will also produce significant reductions in expansivity slope and $T_f$, particularly in combination with controlled cooling rates post-annealing.

Figure 2:
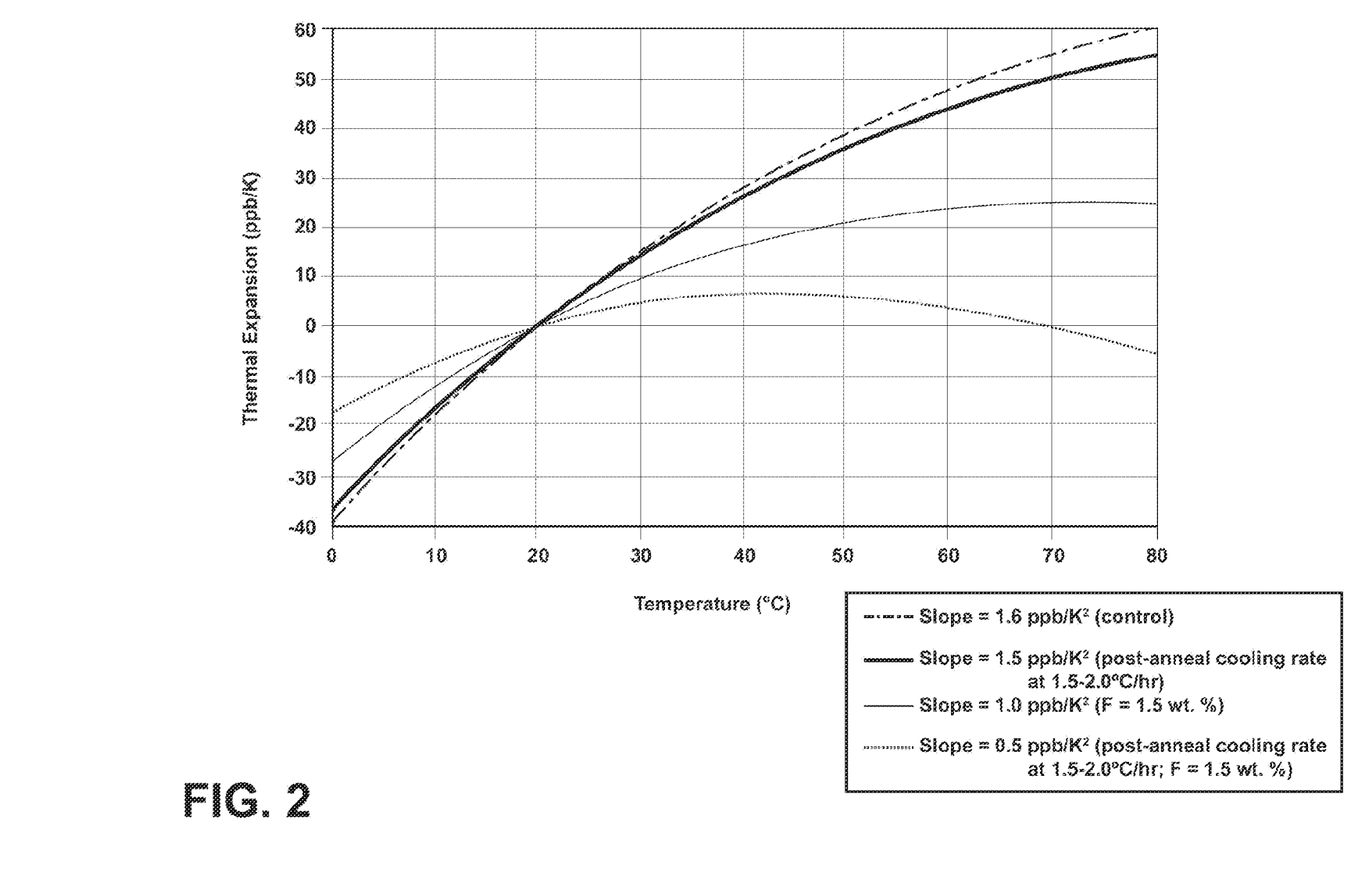
FIG. 2 is a graph of expansivity (ppb/K) vs. temperature (° C.) behavior between 0° C. and 80° C. for ULE glass with various dopant levels and post-annealing cooling rates according to another aspect of the disclosure.

Referring to FIG. 2, a graph of expansivity (ppb/K) vs. temperature (° C.) behavior between 0° C. and 80° C. for ULE glass with various dopant levels and post-annealing cooling rates is provided that demonstrates the effect of fluorine dopants and controlled cooling rates post-annealing. In FIG. 2, each of the curves corresponds to a DST glass with a zero crossover temperature of about 20° C. The "control" group in FIG. 2 has a CTE slope of 1.6 ppb/K$^2$. As is also evident from FIG. 2, the expansivity slope is reduced to 1.5, 1.0 and 0.5 for ppb/K$^2$ the second, third and fourth data groups. In turn, the second, third and fourth data groups correspond to DST glass with a post-anneal cooling rate of 1.5-2.0° C./hr; a fluorine dopant level of 1.5 wt. %; and post-anneal cooling rate of 1.5-2.0° C./hr plus a fluorine dopant level of 1.5 wt. %.

According to some embodiments, reductions in CTE slope (i.e., expansivity) of the DST glass through halogen doping, halogen and oxide doping and/or controlled cooling post-annealing according to aspects of this disclosure, may cause a shift in $T_{ZC}$. Any one, or combination, of the these DST glass modifications to composition and processing to reduce fictive temperature and/or expansivity can, in some cases, displace the CTE vs. temperature curve in an upward direction, causing an undesirable reduction in $T_{ZC}$. A $T_{ZC}$ reduction in the DST glass likely will be indicative of a glass with a net positive expansion at room or ambient temperature that, at least in some cases, may not be acceptable for the given application of the DST glass.

According to an aspect of this disclosure, shifts in $T_{ZC}$ can be managed or otherwise tuned by adjustments to the titania levels in the DST glass. The various CTE vs. temperature curves in FIG. 3 demonstrate this effect. In FIG. 3, four CTE vs. temperature curves are presented corresponding to "first" $T_{ZC}$ values of 20, 25, 30 and 40° C., respectively, for four DST glasses with varying TiO$_2$ concentration levels. Further, each of these four DST glasses possesses an expansivity slope of 0.6 ppb/K$^2$. The titania level for the DST glass with $T_{ZC}$=20° C. is the lowest among the four glasses, the titania level for the DST glass with $T_{ZC}$=25° C. is higher and so on for the remaining two glasses. As such, increases in titania levels tend to cause a downward shift in the CTE vs. temperature curve for a given glass. Consequently, the dopant levels, post-annealing cooling rates and titania levels in the DST glass can be modified and optimized to achieve desired expansivity, $T_f$ and/or $T_{ZC}$ values that are required for a particular application of the DST glass. Given the difficulty in precisely controlling the particular concentration of titania in the final DST glass composition, according to some aspects, the annealing temperature and duration can be adjusted to also produce shifts in the CTE expansion vs. temperature curves for a given DST glass. Similarly, a secondary annealing step can be employed to the same effect, executed after complete cooling of the DST glass and initial characterizations. As such, changes in the titania concentration, annealing parameters, number of annealing steps, and combinations of these factors can be used to effectively tune the $T_{ZC}$ values for DST glass and articles according to an aspect of the disclosure.

It will be apparent to those skilled in the art that various modifications and variations can be made without departing from the spirit or scope of the claims.

What is claimed is:

1. A doped silica-titania glass article, comprising:
   a glass article having a glass composition comprising
   (i) a silica-titania base glass,
   (ii) a fluorine dopant, and
   (iii) a second dopant,
   wherein the fluorine dopant has a concentration of fluorine of up to 5 wt. % and the second dopant comprises one or more oxides selected from the group consisting of Al, Nb, Ta, B, Na, K, Mg, Ca and Li oxides at a total oxide concentration from 50 ppm to 6 wt. %, and
   further wherein the glass article has an expansivity slope of less than 0.5 ppb/K$^2$ at 20° C.

2. The article of claim 1, wherein the silica-titania base glass contains 8 wt. % to 16 wt. % titania and the remainder silica.

3. The article of claim 1, wherein the glass article has an expansivity slope of less than 0.25 ppb/K$^2$ at 20° C.

4. The article of claim 1, wherein the glass article has a fictive temperature of less than 750° C.

5. The article of claim 1, wherein the glass article has a first and a second zero crossover temperature between 0° C. and 100° C. and the maximum CTE between the zero crossover temperatures is less than 8 ppb/K.

6. A doped silica-titania glass article, comprising:
   a glass article having a glass composition comprising
   (i) a silica-titania base glass,
   (ii) a fluorine dopant at a concentration of up to 5 wt. %, and
   (iii) an OH concentration of less than 100 ppm,
   wherein the glass article has an expansivity slope of less than 0.5 ppb/K$^2$ at 20° C.

7. The article of claim 6, wherein the silica-titania base glass contains 8 wt. % to 16 wt. % titania and the remainder silica.

8. The article of claim 6, wherein the glass article has an expansivity slope of less than 0.25 ppb/K$^2$ at 20° C.

9. The article of claim 6, wherein the glass article has a fictive temperature of less than 750° C.

10. The article of claim 6, wherein the glass article has a first and a second zero crossover temperature between 0° C. and 100° C. and the maximum CTE between the zero crossover temperatures is less than 8 ppb/K.

11. A method for making a doped silica-titania glass body, comprising the steps:
   preparing silica-titania soot particles using a silica precursor and a titania precursor;
   forming a soot blank from the soot particles;
   consolidating the soot blank in a furnace, wherein the consolidation step comprises:
      (a) heating the soot blank to more than 1200° C. in a flowing inert atmosphere, and
      (b) consolidating the blank at a peak temperature of more than 1250° C. under a flowing consolidation gas comprising helium- and oxygen-containing gases, and a doping gas comprising a fluorine-containing gas;

sectioning the blank into at least one glass body;

heating the at least one glass body to a crystal melting temperature of at least 1500° C.; and cooling the at least one glass body from the crystal melting temperature to room temperature, the step for cooling comprising a first annealing of the at least one glass body for about 2 hours to 2000 hours between 1050° C. and 700° C. at a first cooling rate between about 50° C./hour and 0° C./hour.

12. The method of claim 11, further comprising the step:

second annealing the at least one glass body after the first annealing, the second annealing comprising
(i) heating the at least one glass body to an upper annealing temperature in the range of 800° C. to 1000° C. for about 0.5 to 2 hours, and
(ii) cooling the at least one glass body from the upper annealing temperature to a lower annealing temperature in the range of 600° C. to 700° C. at a second cooling rate between about 50° C./hour and 0° C./hour, wherein the second annealing step is conducted during or after the step of cooling the at least one glass body from the crystal melting temperature to room temperature.

13. The method of claim 11, wherein the concentration of the fluorine-containing gas is set to obtain up to about 5% by weight of fluorine in the at least one glass body.

14. The method of claim 11, wherein the step for preparing silica-titania soot particles further comprises using at least one oxide dopant precursor selected from the group consisting of Al, Nb, Ta, B, Na, K, Mg, Ca and Li oxides to obtain at a total oxide concentration in the at least one glass body from 50 ppm to 6 wt. %.

15. The method of claim 11, wherein the at least one glass body has an expansivity slope of less than 0.5 ppb/K$^2$ at 20° C. after the cooling step.

16. A method for making a doped silica-titania glass body, comprising the steps:

preparing silica-titania soot particles using a silica precursor and a titania precursor;

forming a soot blank from the soot particles;

consolidating the soot blank in a furnace, wherein the consolidation step comprises:
(a) heating the soot blank to more than 1200° C. in a flowing inert atmosphere, and
(b) consolidating the blank at a peak temperature of more than 1250° C. under a flowing consolidation gas comprising helium- and oxygen-containing gases sectioning the blank into at least one glass body;

heating the at least one glass body to a crystal melting temperature of at least 1500° C.;

diffusing an alkali dopant at a concentration of 0.04 wt. % to 1.4 wt. % by alkali oxide into the at least one glass body at or above 500° C. after the step of heating the at least one glass body to a crystal melting temperature; and cooling the at least one glass body from the crystal melting temperature to room temperature, the step for cooling comprising a first annealing of the at least one glass body for about 2 hours to 2000 hours between 1050° C. and 700° C. at a first cooling rate that is set between about 50° C./hour and 0° C./hour.

17. The method of claim 16, further comprising the step:

second annealing the at least one glass body after the first annealing, the second annealing comprising
(i) heating the at least one glass body to an upper annealing temperature in the range of 800° C. to 1000° C. for about 0.5 to 2 hours, and
(ii) cooling the at least one glass body from the upper annealing temperature to a lower annealing temperature in the range of 600° C. to 700° C. at a second cooling rate between about 50° C./hour and 0° C./hour, wherein the second annealing step is conducted during or after the step of cooling the at least one glass body from the crystal melting temperature to room temperature.

18. The method of claim 16, wherein the step for preparing silica-titania soot particles further comprises using at least one dopant precursor selected from the group consisting of B-, halogen-, OH-, Mn-, and alkaline earth-containing precursors.

19. The method of claim 16, wherein the flowing consolidation gas further comprises a halogen-containing gas.

20. The method of claim 16, wherein the at least one glass body has an expansivity slope of less than 1.3 ppb/K$^2$ at 20° C. after the cooling step.

* * * * *